P. MURCHEK.
LOW PRESSURE GAS ALARM AND AUTOMATIC SHUT-OFF.
APPLICATION FILED AUG. 10, 1917.

1,251,808.

Patented Jan. 1, 1918.
2 SHEETS—SHEET 1.

Inventor
P. Murchek

By A. W. Wilson
Attorney

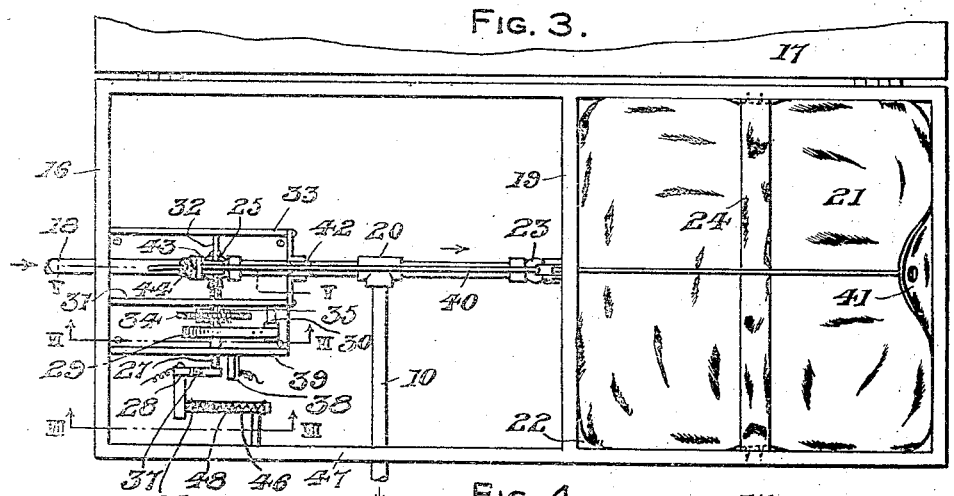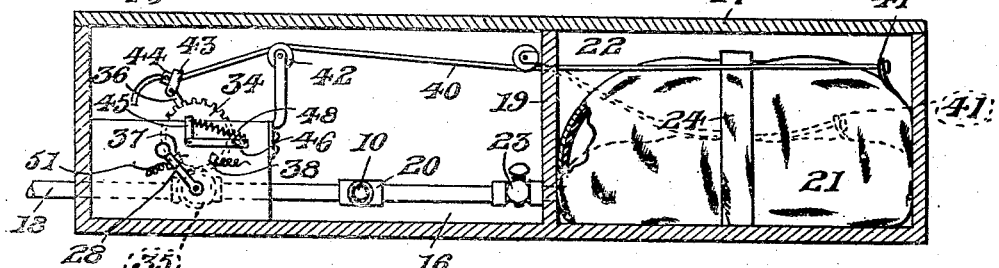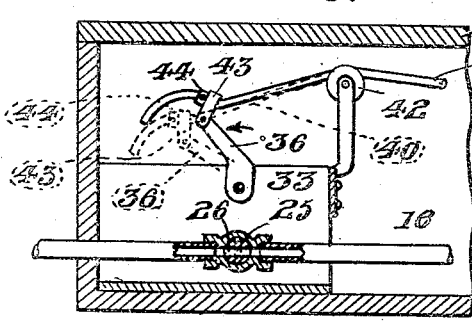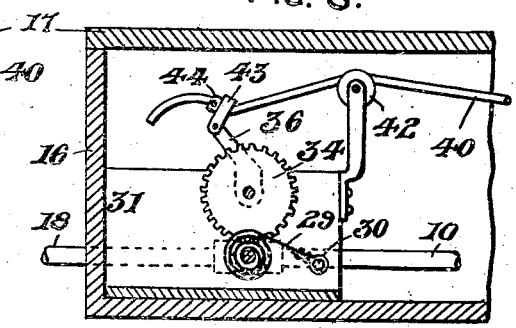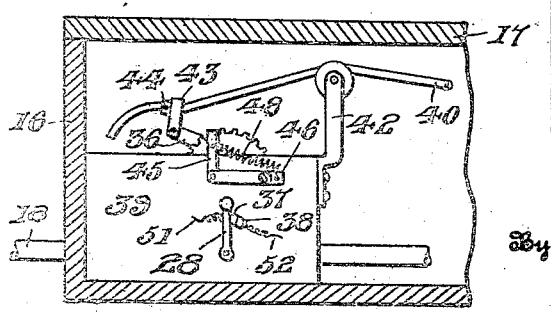

UNITED STATES PATENT OFFICE.

PAUL MURCHEK, OF SHARON, PENNSYLVANIA.

LOW-PRESSURE GAS-ALARM AND AUTOMATIC SHUT-OFF.

1,251,808.  Specification of Letters Patent.  Patented Jan. 1, 1918.

Application filed August 10, 1917. Serial No. 185,621.

*To all whom it may concern:*

Be it known that I, PAUL MURCHEK, a subject of the King of Hungary, residing at Sharon, in the county of Mercer and State of Pennsylvania, have invented certain new and useful Improvements in Low-Pressure Gas-Alarms and Automatic Shut-Offs, of which the following is a specification.

This invention relates to certain new and useful improvements in a low pressure gas alarm and automatic shut off.

The primary object of the invention is the provision of a safety appliance adapted for installation in connection with the gas service of a building, whereby a reduction or cessation of gas pressure, automatically sounds a distant alarm and closes a controlling valve for the gas supply, thereby preventing any damage from the escape of a gas due to the extinguishing of lights by the failure of the gas supply.

A further object of the invention is the provision of a device adapted to be installed between the gas meter and the gas supply piping of a building for automatically shutting off the gas upon a predetermined reduction in the gas pressure and thereby preventing the asphyxiation of the inmates due to escaping gas, while an alarm is sounded and a limited auxiliary supply of gas is slowly supplied to prevent entire extinguishing of the light for a short period of time.

A still further object of the invention is the provision of a safety device that is compact in arrangement and durable in construction adapted for ready insertion in the gas piping of a building, whereby the gas supply is automatically cut off and an alarm sounded at any convenient point upon the reduction in the gas pressure below a certain predetermined degree.

In the drawings forming a part of this application and in which like designating characters refer to corresponding parts throughout the several views, Figure 1 is a view of a portion of a building shown partially in elevation and partly in vertical section with my invention installed therein in connection with the gas service pipes of the building.

Fig. 3 is a top plan view of the mechanism casing employed with the device, with the lid thereof open and the mechanism in its latched arrangement.

Fig. 4 is a longitudinal sectional view thereof with the lid closed and the mechanism in its normal set arrangement.

Fig. 5 is a vertical sectional view taken upon line V—V of Fig. 3 with the valve controlling lever indicated by dotted lines as positioned when the valve is closed.

Fig. 6 is a similar sectional view taken upon line VI—VI of Fig. 3.

Fig. 7 is a similar view taken upon line VII—VII of Fig. 3 with the members in the position assumed after the device has been tripped and with the alarm circuit closed and Fig. 8 is a detail view of the latching means for the circuit closer.

Figure 1:
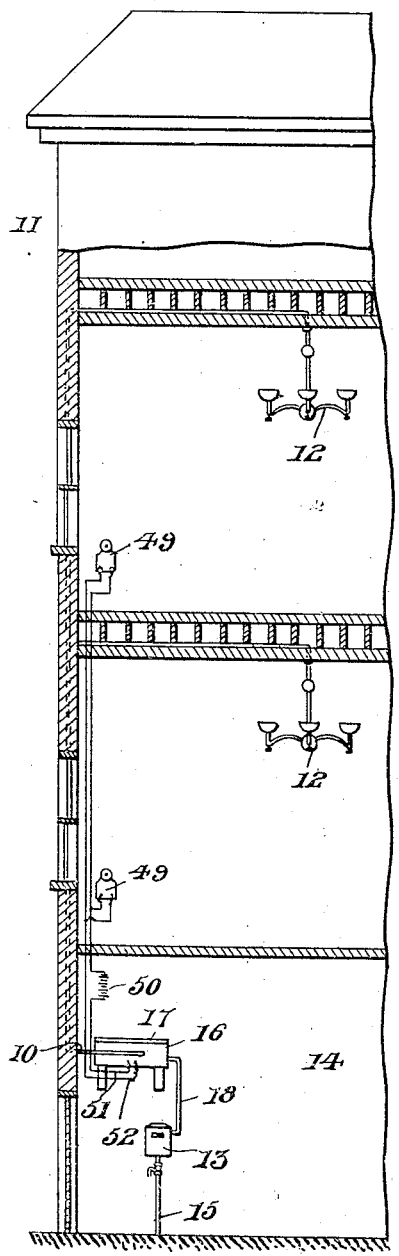
Figure 2:
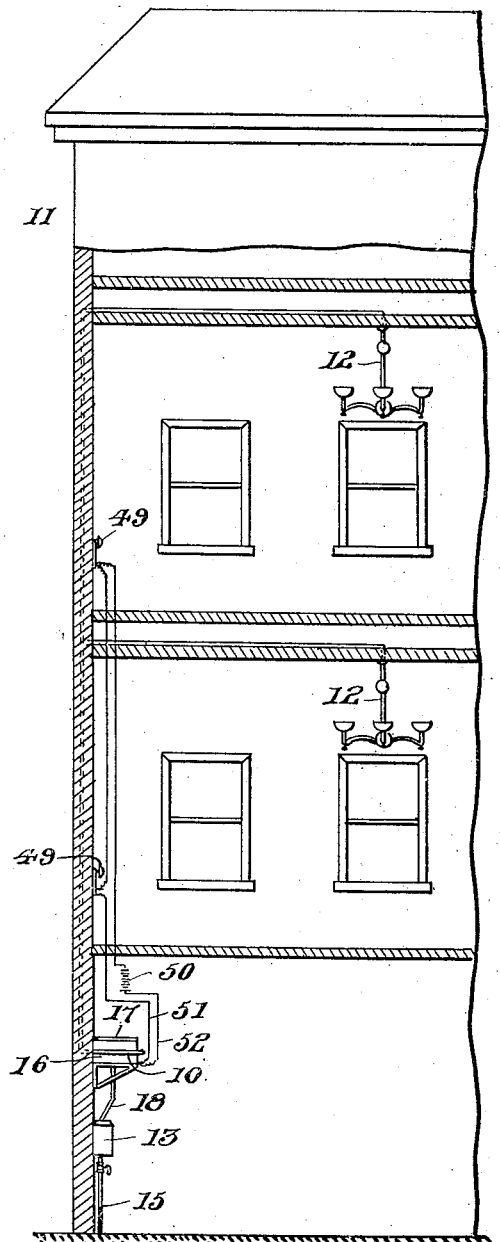
Fig. 2 is a similar view taken from a different side of the building.

Referring more in detail to the drawings, the device is herein illustrated by way of example in connection with the gas supply pipes 10 within a building 11 arranged with chandeliers 12 for burning the gas for illuminating purposes while the usual gas meter 13 is illustrated in the lower story 14 of the building in communication with the service supply pipe 15 for the gas leading to the street main, not shown, in the usual manner.

A mechanism casing 16 is arranged preferably having a hinged lid or cover 17, the same being arranged with the house pipe 10 entering the casing and connected by a T-union 20 with a stub pipe 18 serving as a supply pipe from the outlet of the meter 13 and extending longitudinally within the casing 16 to and through a transverse partition 19 arranged therein. A gas bag 21 is connected to the inner end of the supply pipe 18 within the compartment 22 formed adjacent one end of the casing 16 by the partition 19. The bag 21 is adapted to be inflated by the normal pressure of the gas entering from the supply pipe 18 while the entrance and exit of the gas is controlled respecting the bag 21 by a valve 23 arranged in the pipe 18 adjacent the said partition. A strap 24 overlies the bag 21 for holding the same in position as well as limiting the degree of inflation thereof.

A shut off valve 25 is provided in the supply pipe 18 before the union 20 is reached, having a turn plug 26 arranged with an elongated valve stem 27 provided with a crank 28 at one end thereof, the said crank being normally positioned as illustrated in Fig. 4 of the drawing when the valve 25 is open permitting free passage of the gas from the supply pipe 18 to the house pipe 10 as well as the bag 21. A spring 29 is coiled around the valve stem 27 having one end attached thereto while its other end is anchored as at 30 to a plate 31 within the casing 16, the said spring tending to close the valve whenever the valve is released.

A shaft 32 is journaled through the plate 31 and a similar plate 33 arranged adjacent thereto, the shaft 32 being in parallelism with the valve stem 27 and arranged with a gear 34 thereon in constant mesh with a pinion 35 provided upon the valve stem 27. An operating lever 36 is secured to the shaft 32 and a forward movement of the lever 36 is adapted for opening the valve 25 by means of the gear 34 and pinion 35 it being understood that when the lever 36 is held in its forward position, the valve 25 will be held open but when the lever is released the spring 29 automatically closes the valve 25 carrying the lever 36 to its rearward position as illustrated in Fig. 7 of the drawing and at which time the crank 28 is swung upwardly with the electrical contact point 37 thereof contacting a terminal block 38 carried by a plate 39 adjacent the said lever 28. A cord or strap 40 is attached at one end to a tab 41 on the top of the bag 21 and passes over a pulley wheel 42 carried by the plates 31 and 33 and is adjustably connected to the free end of the lever 36 by means of a link 43 pivoted to the lever and a take-up washer 44 adjustably carried by the strap.

With the casing 16 suitably arranged in connection with the gas pipe of a building and with the meter pipe 18 connected to the house supply pipe 10 within the casing 16, the crank 28 is manually moved rearwardly for opening the valve 25 and forwardly positioning the lever 36. A latch 45 is pivoted to the free end of an arm 46 mounted upon the adjacent side 47 of the casing 16 and adapted to be manually positioned engaging the crank 28 adjacent the contact 37 thereof when the valve 25 is partially opened. The flow of gas from the pipe 18 into the bag 21 inflates the bag which moves the tab 41 upwardly and rearwardly from its dotted line position to its full line position as illustrated in Fig. 4, thereby exerting a pull upon the strap 40 which is maintained constant while the bag 21 is inflated by the normal supply of gas through the pipe 18. This operation of the strap 40 moves the valve 25 to its entirely open position, moving the crank 28 slightly further rearwardly, thereby releasing the latch 45 and permitting the spring 48 thereof to swing the latch upwardly to its position illustrated in Fig. 7.

It will be understood that when the supply of gas in the pipe 18 is reduced in pressure or stops flowing for any reason, the gas within the bag 21 will slowly pass out of the bag under the control of the valve 23 to the house pipe 10, thereby furnishing a small auxiliary supply of gas for the building. This deflation of the bag 21 releases the strap 40 permitting the lever 36 to move rearwardly under the influence of the spring 29 which spring closes the valve 25. It will be understood that the terminals 37 and 38 are electrically connected with suitable alarms 49 and a battery 50 arranged at any desirable positions within the building 11 such connections being made by means of wires 51 and 52 connected respectively to the terminals 37 and 38. The terminals 37 and 38 are in contact with each other when the valve 25 is closed in the manner hereinbefore described so that the alarms 49 are sounded upon the closing of the gas supply controlling valve 25, the contact between the terminals 37 and 38 being broken by rearwardly moving the crank 28 and positioning the latch 45 in contact therewith when the valve 25 is again manually reopened. It will be evident from this detail description of the device and its operation that all connections with the gas pipe 15 from the street will be automatically cut off from the house pipe 10 by closing the valve 25 when the pressure of the gas from the supply pipe 18 falls sufficiently to deflate the gas bag 21 for releasing the strap 40 and that no gas can again enter the house pipe 10 nor the bag 21 until the valve 25 is manually opened by rearwardly swinging the crank 28 which operation stops the ringing of the alarms 49. The flow of gas through the pipe 18 after the valve 25 has once been closed can therefore not enter the building and escape therein to cause injury to the occupants thereof. A serviceable protector for the lives of the occupants of the building is arranged and it will be understood that while the preferred embodiment of the invention is herein set forth, minor changes may be made therein without departing from the spirit and scope of the invention as claimed.

What I claim as new is:—

1. A device of the class described comprising a casing, a gas bag arranged therein, a gas inlet supply pipe extending within the casing connected to the bag, a house distributing gas pipe connected to said inlet pipe within the casing, a controlling valve arranged in the inlet pipe, a controlling lever operatively connected to the said valve, a flexible connection between the said lever and bag adapted for maintaining the valve in its open position when the bag is inflated, a turn crank for said valve, and a retaining latch for said crank adapted for automatic disengagement therefrom, upon the complete inflation of the bag.

2. A device of the class described comprising a casing, a gas bag arranged therein, a gas inlet supply pipe extending within the casing connected to the bag, a house distributing gas pipe connected to said inlet pipe within the casing, a controlling valve arranged in the inlet pipe, a controlling lever operatively connected to the said valve, a flexible connection between the said lever and bag adapted for maintaining the valve in its open position when the bag is inflated, a turn crank for said valve, a retaining latch for said crank adapted for automatic disengagement therefrom upon the complete inflation of the bag, an electric contact carried by said crank, a companion contact mounted within the casing within the path of movement of said crank carried contact during the closing of the valve and a source of electrical supply, and a plurality of distantly positioned alarms arranged in circuit with the said contacts.

3. A device of the class described comprising a casing, a gas bag arranged therein, a gas inlet supply pipe extending within the casing connected to the bag, a house distributing gas pipe connected to said inlet pipe within the casing, a controlling valve arranged in the inlet pipe, a controlling lever operatively connected to the said valve, a flexible connection between the said lever and bag adapted for maintaining the valve in its open position when the bag is inflated, a valve in the inlet pipe adjacent its connection with the bag adapted for controlling the flow of gas to and from the bag, manually operated opening means for the first mentioned supply valve, and a temporary automatically releasable latch for the said opening means.

In testimony whereof I affix my signature.

PAUL MURCHEK.

Copies of this patent may be obtained for five cents each, by addressing the "Commissioner of Patents, Washington, D. C."